US010028618B1

(12) United States Patent
Benson (10) Patent No.: US 10,028,618 B1
(45) Date of Patent: Jul. 24, 2018

(54) CANNABIS PERSONAL PROCESSOR APPARATUS (71) Applicant: Jeffrey Benson, Las Vegas, NV (US)

(72) Inventor: Jeffrey Benson, Las Vegas, NV (US)

( * ) Notice: Subject to any disclaimer, the term of this patent is extended or adjusted under 35 U.S.C. 154(b) by 0 days.

(21) Appl. No.: 15/851,366

(22) Filed: Dec. 21, 2017

(51) Int. Cl.
*A47J 42/00* (2006.01)
*A47J 42/16* (2006.01)
*B02C 18/08* (2006.01)
*A47J 42/50* (2006.01)
*B02C 18/22* (2006.01)
*A24C 5/40* (2006.01)
*A47J 43/25* (2006.01)

(52) U.S. Cl.
CPC ............... *A47J 42/16* (2013.01); *A24C 5/40* (2013.01); *A47J 42/00* (2013.01); *A47J 42/50* (2013.01); *B02C 18/08* (2013.01); *B02C 18/2216* (2013.01); *A47J 43/255* (2013.01)

(58) Field of Classification Search
CPC .. A47J 42/50; A47J 42/16; A47J 42/26; A47J 42/06; A47J 43/255; B02C 18/08; B02C 18/2216; A24C 5/40; A24C 5/42
USPC ................. 241/169.1, 282.1, 282.2
See application file for complete search history.

(56) References Cited

U.S. PATENT DOCUMENTS

| | | | | |
|---|---|---|---|---|
| 2,633,133 A * | 3/1953 | Higgins | ................... | A24C 5/42 131/74 |
| 3,892,245 A * | 7/1975 | Asbill, Jr. | ................ | A24C 5/02 131/109.3 |
| 4,280,666 A * | 7/1981 | Jones | ....................... | A47J 42/34 241/100 |
| 4,555,984 A * | 12/1985 | Yamashita | ............... | A47J 31/42 241/101.2 |
| 4,572,216 A * | 2/1986 | Josuttis | ..................... | A24C 5/42 131/70 |
| 5,666,975 A * | 9/1997 | Lord | ........................ | A24C 5/00 131/108 |
| 7,422,170 B2 * | 9/2008 | Bao | ......................... | B02C 18/24 241/168 |
| 7,568,640 B2 * | 8/2009 | Rademacher | ......... | E04D 13/076 241/21 |
| 7,909,276 B2 * | 3/2011 | Deppermann | .......... | B02C 18/12 241/100 |
| 8,083,167 B1 * | 12/2011 | Namakian | ............... | A47J 42/24 241/169.1 |
| 8,393,563 B2 * | 3/2013 | Chaoui | ................... | B02C 18/08 241/168 |
| 8,695,906 B2 * | 4/2014 | Hainbach | ................ | A47J 42/14 241/169.1 |
| 9,155,418 B2 * | 10/2015 | Lai | ....................... | A47J 31/3623 |
| 9,427,020 B2 * | 8/2016 | Ruzycky | .................. | A24C 5/02 |
| 9,737,092 B2 * | 8/2017 | Grumbacher | ............ | A24C 5/40 |
| 2010/0301806 A1 | 12/2010 | Ormaza et al. | | |
| 2013/0091802 A1 * | 4/2013 | Bentley | ................... | A47J 42/26 53/111 R |

(Continued)

*Primary Examiner* — Faye Francis
(74) *Attorney, Agent, or Firm* — Integrity Patent Group, PLC; Edwin Wold (57) ABSTRACT

A cannabis personal processor apparatus is disclosed herein including a cylindrical-shaped body having a first end and a second end, a dispensing cone, an operation switch, a light strip, a rechargeable battery, a plurality of blades, a lid, and a stand. The device is configured to produce finely ground Cannabis with enhanced flavor and greater potency.

19 Claims, 7 Drawing Sheets

(56) References Cited

U.S. PATENT DOCUMENTS

2015/0298135 A1* 10/2015 Spielman .............. B02C 18/144
 241/101.01
2016/0143480 A1* 5/2016 Watts ...................... A47J 42/24
 241/69

* cited by examiner

CANNABIS PERSONAL PROCESSOR
APPARATUS

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of cannabis accessories and more specifically relates to a cannabis processor.

2. Description of Related Art

Cannabis has been legalized in the USA and most states have adopted those laws. As the cannabis industry grows, the need to meet those demands from the users increase. In the past, users had to break up a bud with their hands and roll a joint or fill a pipe or bowl. At this point in time there are herb grinders being used to break up the buds and hand grinders. Herb grinders are important tools to break down herbs, spices, and the like from solid or dense masses into more fine substances. In order to use an herb grinder, a user needs to touch the bud with his/her hands. This in turn, removes the kief from the leaf. The kief is the most potent portion of the bud, therefore making it desirable to keep as much of it as possible. The need exists for a more efficient means for breaking up Cannabis. A suitable solution is desired.

U.S. Pub. No. 2010/0301806 to Manuel Ormaza relates to a rechargeable electric herb grinder. The described rechargeable electric herb grinder includes a rechargeable electric herb grinder according to one embodiment comprises a grinder housing having one or more of housing compartments attachable to each other along a separating joint, a grinding chamber for receiving an herb, the grinding chamber being formed inside the grinder housing by the housing compartments and a spacer, an electric motor separated from the grinding chamber by the spacer, the spacer being rigidly coupled to the electric motor, a driven shaft mounted and received in the grinder chamber through an aperture in the spacer for rotation of a grinding means mounted on the driven shaft by the power provided by the electric motor, the grinding means being utilized to grind the herb, an internal rechargeable battery located outside of the grinding chamber, the internal rechargeable battery having first conductors to provide electric current to the electric motor, a recharging plug coupled to the grinding housing to recharge the internal rechargeable battery and having second conductors for connecting to an external power supply, thereby enabling recharging of the internal rechargeable battery, and a two-condition control switch, a relay having at least one pair of openable and closable contacts, and third conductors electrically interconnecting the electric motor, the two-condition control switch and the relay with the internal rechargeable battery.

BRIEF SUMMARY OF THE INVENTION

In view of the foregoing disadvantages inherent in the known cannabis accessory art, the present disclosure provides a novel cannabis personal processor apparatus. The general purpose of the present disclosure, which will be described subsequently in greater detail, is to provide an efficient device to chop bud.

A cannabis personal processor apparatus is disclosed herein. The cannabis personal processor apparatus includes a cylindrical-shaped body having a first end and a second end, a dispensing cone, an operation switch, a light strip, a rechargeable battery, a plurality of blades, a lid, and a stand. The cylindrical-shaped body is divided into a plurality of compartments. The device is electric and uses a chopping blade rather than a cutting blade. The chopping blade is designed to pull a leaf from a stem and separate them so that the leaf falls through a screen into a collection bowl at the bottom of the device. A connecting unit is provided which allows the leaf to fall directly into a joint, pre-rolled cone joint, pipe, bowl or other smoking implement. The cannabis personal processor apparatus allows for sanitary handling of cannabis while preserving the potency.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a cannabis personal processor apparatus, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to cannabis accessories and more particularly to a cannabis personal processor apparatus as used to improve the chopping and breaking up of a bud.

Generally, this device an electric personal processor that uses a chopping blade instead of a cutting blade. The chopping blade is designed to pull the leaf from the stem and separate it so that the leaf falls through a screen into a collection bowl at the bottom of the device. It also includes a connecting unit that allows the leaf to fall directly into a joint, a pre-rolled cone joint, a pipe or a bowl. All of this allows the most sanitary and potent use of the cannabis bud. With the cannabis personal processor apparatus, a user can use small tongs to pick up the bud and place it into the chopping and separation area without touching it. The device also comes with a paddle and brush for cleaning the device. The entire process takes about 2 to 3 seconds which makes it fast and easy.

The device may include an LED light inside the device for more enjoyable use. It is different from a grinder in that it is not designed to cut the bud with a blade but to chop the bud and remove the leaf from the stem. This provides a much better flavor for the marijuana smoke. It chops the bud so that the leaf portion falls through the screen below the chopping blade and keeps the stem on the top of the screen and does not fall through the screen. The leaf then travels down into a funnel portion that can hold it there or it flows through the opening down into the pre-rolled, pipe or bowl to then be smoked. It allows the user to never touch the cannabis with their hands or fingers. This allows more of the kief that is on the bud to stay on the bud and therefore provides better flavor and better potency of the bud. This unit is for personal use and a larger unit with the same design features can be used for commercial use as well. This is the first personal processor to be designed for this purpose. It is not used for grinding up herbs and such, as it is a device designed specifically for Cannabis processing.

Figure 1:
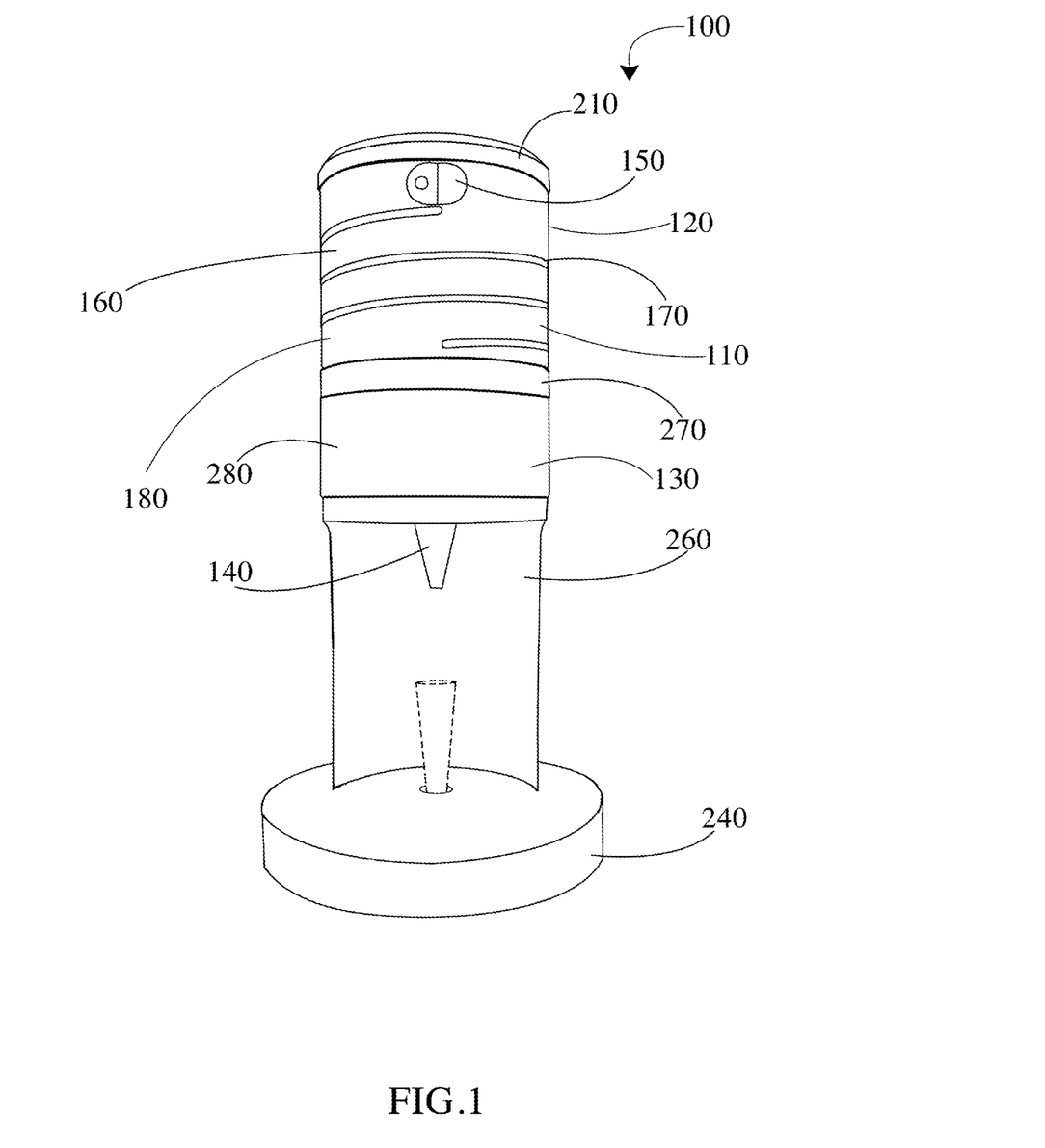
FIG. 1 is a perspective view of the cannabis personal processor apparatus during an 'in-use' condition, according to an embodiment of the disclosure.

Referring now more specifically to the drawings by numerals of reference, there is shown in FIGS. 1-7, various views of a cannabis personal processor apparatus 100. FIG. 1 shows a cannabis personal processor apparatus 100, according to an embodiment of the present disclosure. As illustrated, the cannabis personal processor apparatus 100 may include a cylindrical-shaped body 110 having a first end 120 and a second end 130, a dispensing cone 140, an operation switch 150, a light strip 170, a rechargeable battery 190, a plurality of blades 200, a lid 210, and a stand 220. The apparatus is configured to produce finely ground Cannabis.

Figure 4:
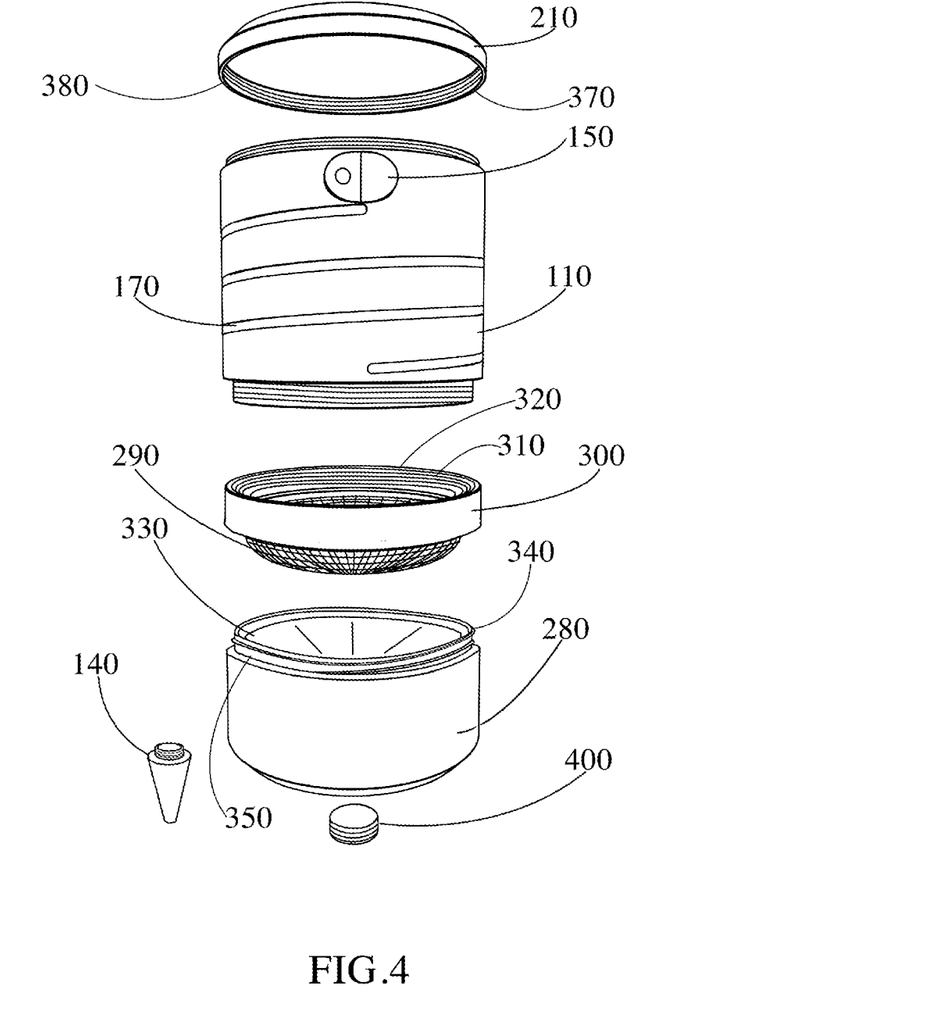
FIG. 4 is an exploded view of the cannabis personal processor apparatus of FIG. 1, according to an embodiment of the present disclosure.

The dispensing cone 140 is preferably removably attached to the second end 130 of the cylindrical-shaped body 110. The operation switch 150 is located on a first of the plurality of compartments 160. The light strip 170 may be located on an outer side surface 180 of the first compartment. The rechargeable battery 190 may be located inside the first compartment. In a preferred embodiment, the rechargeable battery 190 includes a USB port 390 configured to provide charge to the rechargeable battery 190. As shown in FIG. 4, a charger 460 may be provided. The rechargeable battery 190 is configured to provide a power source to an internal motor of the apparatus. The plurality of blades 200 are coupled to the first compartment and are configured to grind the cannabis. In a preferred embodiment, the plurality of blades 200 includes 6 blades for efficiently chopping cannabis.

Figure 2:
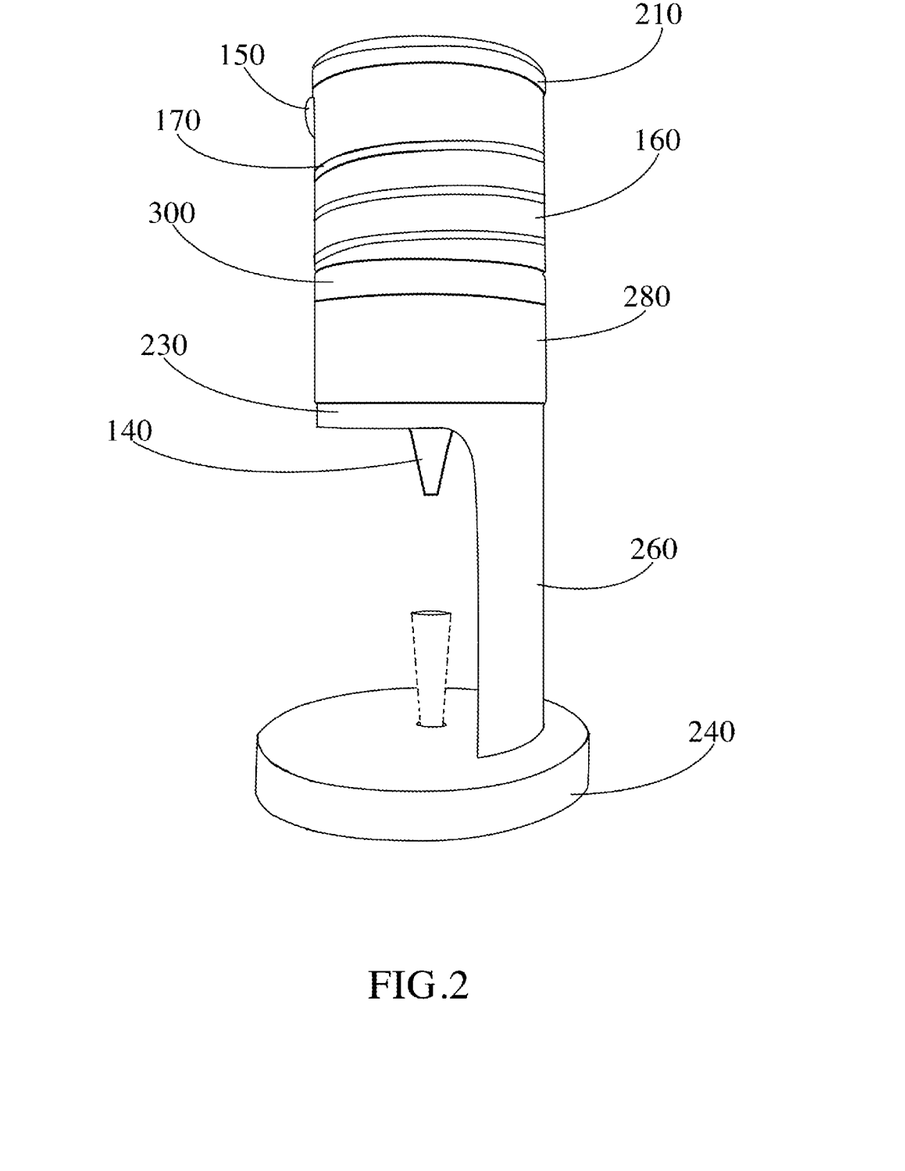
FIG. 2 is a perspective view of the cannabis personal processor apparatus of FIG. 1, according to an embodiment of the present disclosure.

FIG. 2 shows a perspective view of the cannabis personal processor apparatus 100 of FIG. 1, according to an embodiment of the present disclosure. As above, the cannabis personal processor apparatus 100 may include the cylindrical-shaped body 110 having the first end 120 and the second end 130, the dispensing cone 140, the operation switch 150, the light strip 170, the rechargeable battery 190, the plurality of blades 200, the lid 210, and the stand 220. The lid 210 is removably attachable to the first compartment and configured to seal the first compartment from exposure to outside elements. The lid 210 includes threading 370 or other fastening means disposed over a bottom end inner circumference 380. The stand 220 includes a platform structure 230 and a base structure 240. The stand 220 is removably attached to the cylindrical-shaped body 110 and is configured to hold the cylindrical-shaped body 110 in an upright position while in use. The stand 220 includes a spacer 260 positioned between the base structure 240 and the platform structure 230. The spacer 260 is configured to provide a predetermined amount of space between the platform structure 230 and the base structure 240 to prevent damage of the pre-rolled, non-filled cone joint. The base structure 240 has a hole 250. The hole 250 is configured to hold a pre-rolled, non-filled cone joint.

Figure 3:
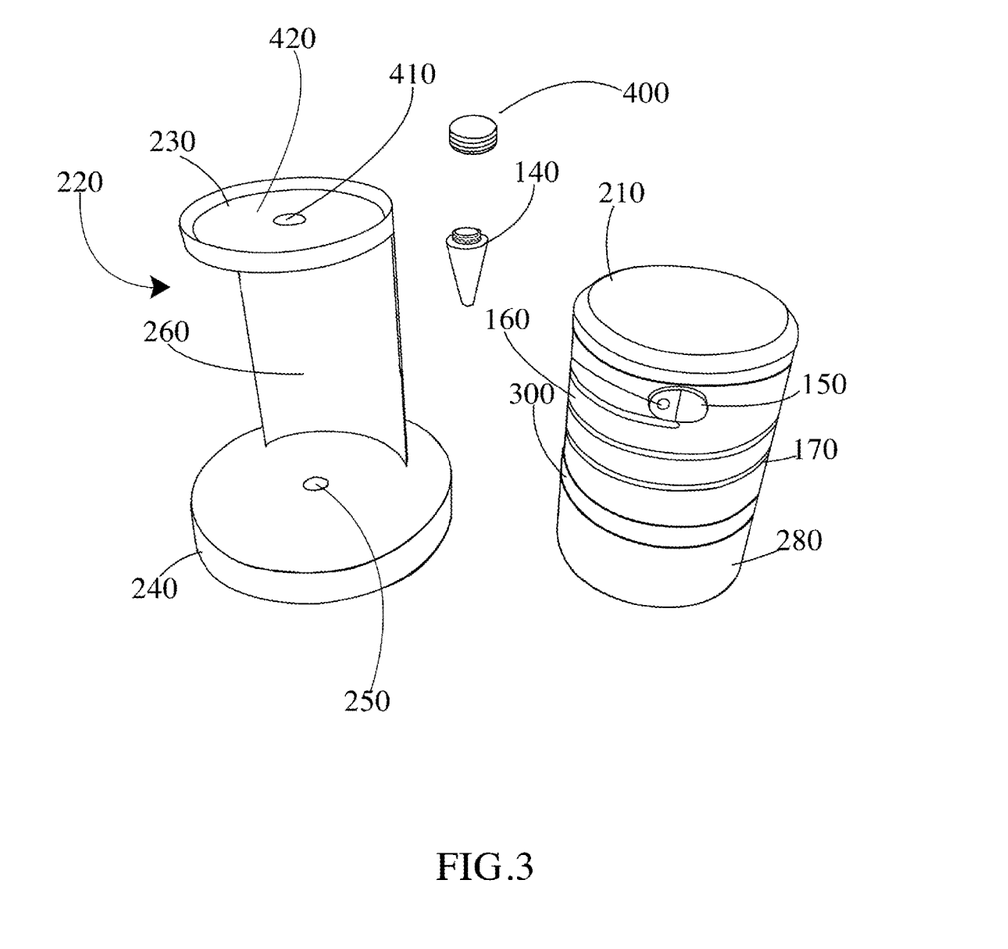
FIG. 3 is a perspective view of the cannabis personal processor apparatus of FIG. 1, according to an embodiment of the present disclosure.

Referring now to FIG. 3 showing a perspective view of the cannabis personal processor apparatus 100 of FIG. 1, according to an embodiment of the present disclosure. As above, the cannabis personal processor apparatus 100 may include the cylindrical-shaped body 110 divided into a plurality of compartments. The cylindrical-shaped body 110 is divided into a plurality of compartments. The plurality of compartments includes the first compartment, a second compartment 270, and a third compartment 280. The second compartment 270 comprises a screen element 290 and a circular rim element 300. The screen element 290 is coupled to the circular rim element 300. The screen element 290 hangs below the circular rim element 300. The second compartment 270 includes threading 310 disposed over an inner circumference 320 of the circular rim element 300. The third compartment 280 is located below the second compartment 270. The third compartment 280 is configured to allow passage of the finely ground cannabis into the dispensing cone 140. The third compartment 280 has a funnel-shaped inner chamber 330. The funnel-shaped inner chamber 330 has a centrally-located aperture. The third compartment 280 includes threading 340 disposed over an outer circumference of a third compartment top end 350.

FIG. 4 shows a perspective view of the cannabis personal processor apparatus 100 of FIG. 1, according to an embodiment of the present disclosure. As above, the cannabis personal processor apparatus 100 may further comprise a screw 400 removably coupled to the centrally-located aperture of the third compartment 280. The screw 400 is configured to seal the apparatus when the apparatus is being transported. The platform structure 230 includes an opening 410 in a center 420 of the platform structure 230. The platform structure 230 is removably coupled to the second end 130 of the cylindrical-shaped body 110. The opening 410 is configured to allow attachment of the dispensing cone 140.

Figure 5:
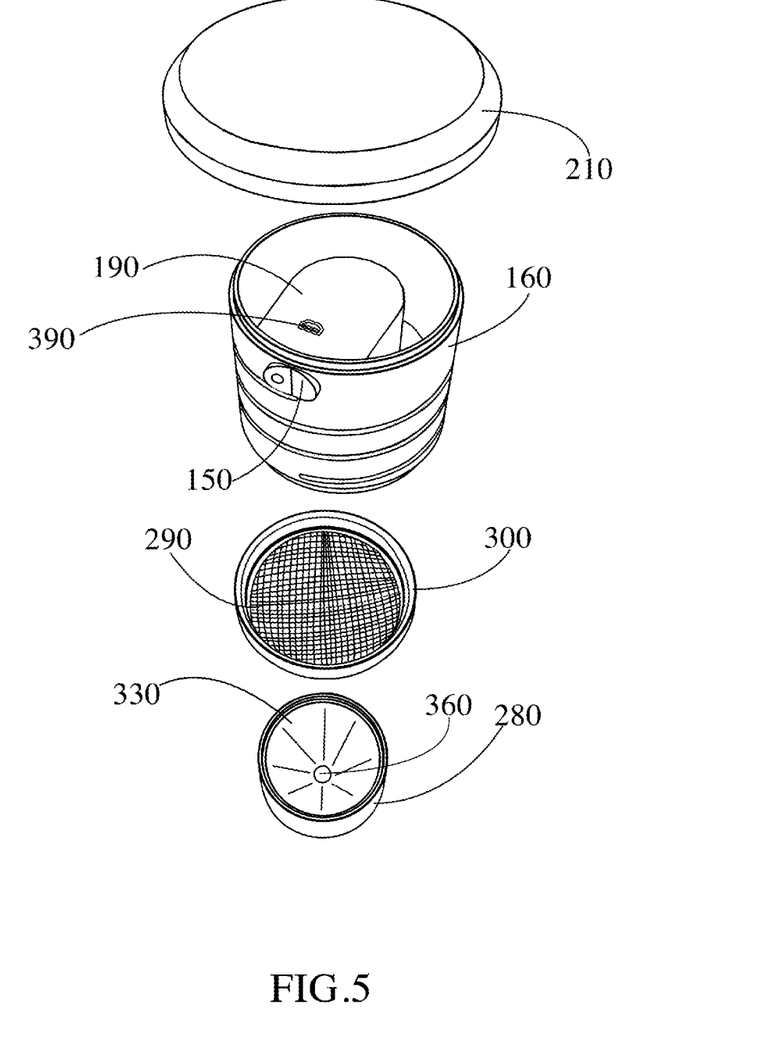
FIG. 5 is an exploded view of the cannabis personal processor apparatus of FIG. 1, according to an embodiment of the present disclosure.
Figure 6:
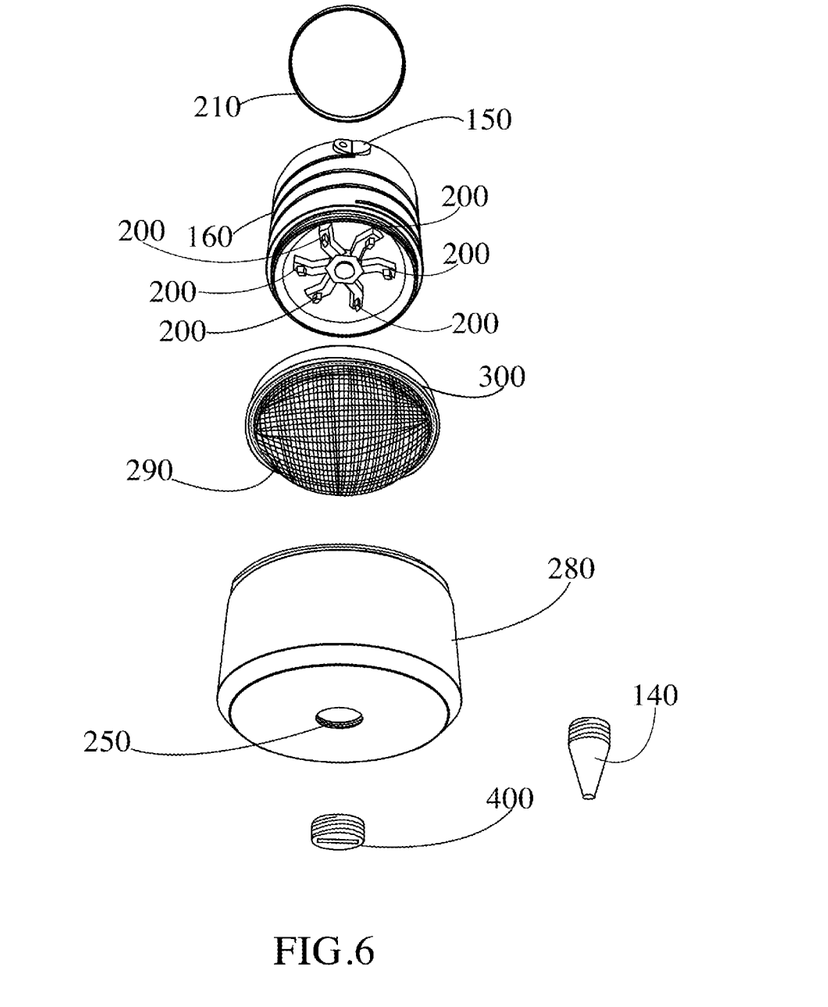
FIG. 6 is an exploded view of the cannabis personal processor apparatus of FIG. 1, according to an embodiment of the present disclosure.
Figure 7:
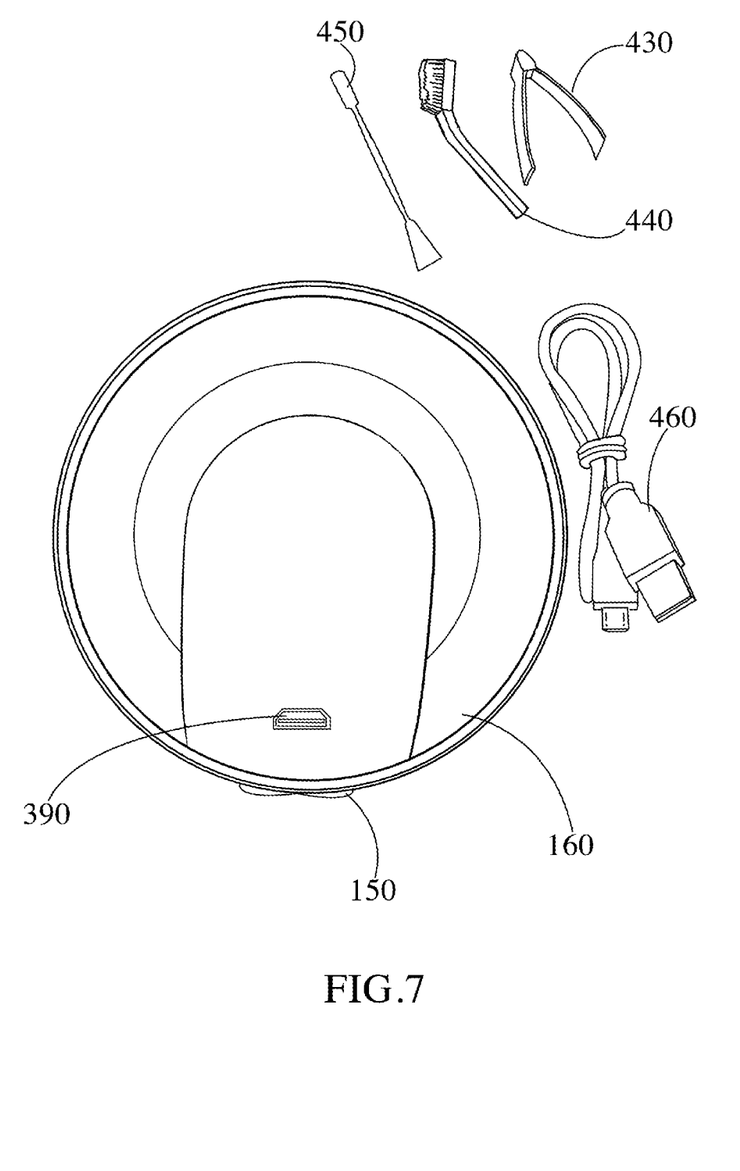
FIG. 7 is a perspective view of the cannabis personal processor apparatus of FIG. 1, according to an embodiment of the present disclosure.

Referring now to FIG. 5 which shows a perspective view of the cannabis personal processor apparatus 100 of FIG. 1, according to an embodiment of the present disclosure. As above, the cannabis personal processor apparatus 100 may further include tweezers 430, the tweezers 430 configured to pick up the Cannabis and place the Cannabis inside the first compartment. The apparatus may further include an angled brush 440, the angled brush 440 configured to remove excess marijuana not filtered through the third compartment 280. The apparatus further includes a scraper 450, the scraper 450 configured to aid in cleaning the apparatus. This unit is designed for personal use and a larger unit with the same design features may be used for commercial use as well.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is:

1. A cannabis personal processor apparatus, comprising:
   a cylindrical-shaped body having a first end and a second end and wherein said cylindrical-shaped body is divided into a plurality of compartments;
   a dispensing cone, said dispensing cone being removably attached to said second end of said cylindrical-shaped body;
   an operation switch, said operation switch being located on a first of said plurality of compartments;
   a light strip, said light strip being located on an outer side surface of said first compartment;
   a rechargeable battery, said rechargeable battery being located inside said first compartment and wherein said rechargeable battery is configured to provide a power source to an internal motor of said apparatus;
   a plurality of blades, said plurality of blades being coupled to said first compartment and wherein said plurality of blades is configured to grind said cannabis;
   a lid, said lid being removably attachable to said first compartment and configured to seal said first compartment from exposure to outside elements;
   a stand, said stand having a platform structure and a base structure and wherein said stand is removably attached to said cylindrical-shaped body and configured to hold said cylindrical-shaped body in an upright position while in use;
   wherein said base structure has a hole;
   wherein said hole is configured to hold a pre-rolled, non-filled cone joint;
   wherein said stand includes a spacer positioned between said base structure and said platform structure and wherein said spacer is configured to provide a predetermined amount of space between said platform structure and said base structure to prevent damage of said pre-rolled, non-filled cone joint; and
   wherein said apparatus is configured to produce finely ground Cannabis.

2. The cannabis personal processor apparatus of claim 1, wherein said plurality of compartments includes said first compartment, a second compartment, and a third compartment.

3. The cannabis personal processor apparatus of claim 2, wherein said second compartment comprises a screen element and a circular rim element, wherein said screen element is coupled to said circular rim element.

4. The cannabis personal processor apparatus of claim 3, wherein said screen element hangs below said circular rim element.

5. The cannabis personal processor apparatus of claim 3, wherein said second compartment includes threading disposed over an inner circumference of said circular rim element.

6. The cannabis personal processor apparatus of claim 2, wherein said third compartment is located below said second compartment and wherein said third compartment is configured to allow passage of said finely ground cannabis into said dispensing cone.

7. The cannabis personal processor apparatus of claim 6, wherein said third compartment has a funnel-shaped inner chamber.

8. The cannabis personal processor apparatus of claim 7, wherein said funnel-shaped inner chamber has a centrally-located aperture.

9. The cannabis personal processor apparatus of claim 6, wherein said third compartment includes threading disposed over an outer circumference of a third compartment top end.

10. The cannabis personal processor apparatus of claim 1, wherein said lid includes threading disposed over a bottom end inner circumference.

11. The cannabis personal processor apparatus of claim 1, wherein said rechargeable battery includes a USB port configured to provide charge to said rechargeable battery.

12. The cannabis personal processor apparatus of claim 8, further comprising a screw removably coupled to said centrally-located aperture of said third compartment and wherein said screw is configured to seal said apparatus when said apparatus is being transported.

13. The cannabis personal processor apparatus of claim 1, wherein said platform structure includes an opening in a center of said platform structure.

14. The cannabis personal processor apparatus of claim 13, wherein said opening is configured to allow attachment of said dispensing cone.

15. The cannabis personal processor apparatus of claim 1, wherein said platform structure is removably coupled to said second end of said cylindrical-shaped body.

16. The cannabis personal processor apparatus of claim 1, wherein said plurality of blades includes 6 said blades.

17. The cannabis personal processor apparatus of claim 1, wherein said apparatus further includes tweezers, said tweezers configured to pick up said Cannabis and place said Cannabis inside said first compartment.

18. The cannabis personal processor apparatus of claim 1, wherein said apparatus further includes an angled brush, said angled brush configured to remove excess marijuana not filtered through said third compartment.

19. The cannabis personal processor apparatus of claim 1, wherein said apparatus further includes a scraper, said scraper configured to aid in cleaning said apparatus.

* * * * *